(12) United States Patent
Sorensen et al.

(10) Patent No.: US 10,337,855 B2
(45) Date of Patent: Jul. 2, 2019

(54) METHOD OF IMAGING AN OBJECT FOR TRACKING AND DOCUMENTATION IN TRANSPORTATION AND STORAGE

(71) Applicant: Mettler-Toledo GmbH, Greifensee (CH)

(72) Inventors: Einar Sorensen, Oslo (NO); Espen Rutger, Oslo (NO)

(73) Assignee: Mettler-Toledo GmbH, Greifensee (CH)

( * ) Notice: Subject to any disclaimer, the term of this patent is extended or adjusted under 35 U.S.C. 154(b) by 154 days.

(21) Appl. No.: 15/423,640

(22) Filed: Feb. 3, 2017

(65) Prior Publication Data

US 2017/0227674 A1    Aug. 10, 2017

(30) Foreign Application Priority Data

Feb. 4, 2016 (EP) .................................. 16154189

(51) Int. Cl.
*G01C 3/00*    (2006.01)
*G01C 7/00*    (2006.01)
(Continued)

(52) U.S. Cl.
CPC .......... *G01B 11/026* (2013.01); *G01B 11/002* (2013.01); *G01B 11/005* (2013.01);
(Continued)

(58) Field of Classification Search
CPC ..... G01B 11/002; G01B 11/005; G01B 11/02; G01B 11/022; G01B 11/024; G01B 11/028; G01B 11/03; G01B 11/04; G01B 11/043; G01B 11/046; G01B 11/06; G01B 11/0691; G01B 11/08; G01B 11/10; G01B 11/105; G01B 11/24; G01B 11/2408; G01B 11/2433; G01B 11/245; G01B 11/25; G01B 11/2518; G01B 11/2522; G01B 11/28; G01B 11/285; G01B 11/026; G01B 11/2527; G01V 8/10; G01V 8/12; G01V 8/14; G01V 8/18; G01V 8/20; G01V 8/22;
(Continued)

(56) References Cited

U.S. PATENT DOCUMENTS 4,855,608 A * 8/1989 Peterson, II .......... G01B 11/02
250/559.19
5,331,118 A * 7/1994 Jensen ................... G01B 11/00
177/245
(Continued)

*Primary Examiner* — Gordon J Stock, Jr.
(74) *Attorney, Agent, or Firm* — Standley Law Group LLP; Jeffrey S. Standley; Stephen L. Grant

(57) ABSTRACT

In a method of operating a dimensioning system with a plurality of laser scanners, a processor controls the operations of the scanners and processes the scanner signals, and further with memory for storing data delivered by the processor, the data acquired by the dimensioning system in its regular mode of operation are used to construct a three-dimensional model of surface points of the object including spatial coordinates and image intensity for each surface point. The three-dimensional model is stored in the memory. Based on the three-dimensional model, two-dimensional images from any desired viewing angle that was exposed to the scanner rays can be produced on demand to document the appearance of the object at the time the scan was taken.

12 Claims, 4 Drawing Sheets

(51) Int. Cl.
*G01V 8/26* (2006.01)
*G01B 11/00* (2006.01)
*G01B 11/02* (2006.01)
*G01B 11/03* (2006.01)
*G01B 11/04* (2006.01)
*G01B 11/06* (2006.01)
*G01B 11/24* (2006.01)
*G01B 11/25* (2006.01)

(52) U.S. Cl.
CPC .............. *G01B 11/02* (2013.01); *G01B 11/03* (2013.01); *G01B 11/04* (2013.01); *G01B 11/06* (2013.01); *G01B 11/0691* (2013.01); *G01B 11/24* (2013.01); *G01B 11/2527* (2013.01); *G01C 3/00* (2013.01); *G01C 7/00* (2013.01); *G01V 8/26* (2013.01); *B65G 2203/0208* (2013.01); *B65G 2203/0225* (2013.01); *B65G 2203/0258* (2013.01); *B65G 2203/044* (2013.01)

(58) Field of Classification Search
CPC .................. G01V 8/26; B65G 2203/02; B65G 2203/0208; B65G 2203/0225; B65G 2203/0233; B65G 2203/0258; B65G 2203/04; B65G 2203/041; B65G 2203/042; B65G 2203/044; G01C 3/00; G01C 3/02; G01C 3/06; G01C 3/08; G01C 3/10; G01C 3/12; G01C 3/14; G01C 3/20; G01C 3/22; G01C 3/24; G01C 3/26; G01C 11/00; G01C 11/02; G01C 11/025; G01C 11/04; G01C 11/06; G01C 11/28; G01C 11/30; G01C 11/32; G01C 11/34; G01C 5/00; G01C 7/00
See application file for complete search history.

(56) References Cited

U.S. PATENT DOCUMENTS

| | | | | |
|---|---|---|---|---|
| 5,699,161 | A * | 12/1997 | Woodworth | G01B 11/00 356/628 |
| 5,841,541 | A * | 11/1998 | Dlugos | G01B 11/02 356/634 |
| 6,061,645 | A * | 5/2000 | Bengala | G01B 11/04 250/559.22 |
| 6,115,114 | A | 9/2000 | Berg et al. | |
| 6,177,999 | B1 | 1/2001 | Wurz et al. | |
| 7,137,556 | B1 * | 11/2006 | Bonner | B07C 3/14 235/462.08 |
| 7,215,430 | B2 | 5/2007 | Kacyra et al. | |
| 7,277,187 | B2 * | 10/2007 | Smith | G01B 11/00 340/928 |
| 9,041,915 | B2 | 5/2015 | Earhart et al. | |
| 9,204,129 | B2 | 12/2015 | Keshavmurthy et al. | |
| 9,880,269 | B2 * | 1/2018 | Sorensen | G01G 19/083 |
| 2002/0048396 | A1 * | 4/2002 | Bewley, Jr. | B44B 1/006 382/154 |
| 2007/0181685 | A1 * | 8/2007 | Zhu | B82Y 15/00 235/454 |
| 2014/0232857 | A1 * | 8/2014 | Jahnke | G01B 11/245 348/135 |
| 2015/0248578 | A1 * | 9/2015 | Utsumi | G06K 9/00201 382/154 |
| 2017/0018094 | A1 * | 1/2017 | Todeschini | G01B 11/00 |

* cited by examiner

METHOD OF IMAGING AN OBJECT FOR TRACKING AND DOCUMENTATION IN TRANSPORTATION AND STORAGE

CROSS-REFERENCE TO RELATED APPLICATIONS

This application is entitled to benefit of a right of priority from European Patent Application No. 16154189.1, filed on 4 Feb. 2016. The content of that application is incorporated by reference as if fully recited herein.

TECHNICAL FIELD

The invention relates to a method of producing images of cargo objects, such as packages, crates and pallets, by employing previously unused capabilities of dimensioning systems. The term "dimensioning" in the present context refers to the process of determining the volume that an object occupies in order to assess shipping and storage charges. A dimensioning system is an apparatus that performs this dimensioning process automatically.

BACKGROUND OF THE ART

The concept of dimensioning stems from the thought that shipping charges should not be determined solely based on the weight of an object, but also based on its dimensions, to account for the amount of space taken up in a warehouse or on a transport carrier such as an airplane, a ship, a railway car or a truck. In practice this means that, in addition to being weighed on a scale, cargo objects are also measured, either manually or with an automated dimensioning apparatus, to determine their so-called dimensional weight, also known as volumetric weight or cube weight, which is based on the length l, width w and height h of a shipping object and a density factor D set by the shipping company. When accepting an object for shipment, its dimensional weight $W_{dim}=l \times w \times h \times D$ and its actual weight (determined by weighing the object on a scale) are compared to each other and the price of shipping is based on the larger of the two weight values. The rationale for this is that light-weight goods occupying a large volume should be priced according to the amount of space taken up rather than based on weight in order to promote compact packaging of goods and efficient use of available cargo space on carrier vehicles and in storage facilities.

On their way from the sender to the recipient, the objects often pass through several distribution hubs where they are transferred from one carrier vehicle to another, which can involve different modes of transportation including airplanes, ships, railways, trucks, conveyors and forklift vehicles. At each transfer, the dimensions of the objects, and often their weights, are determined, in order to make optimum use of the available cargo space while avoiding the risk of overloading.

Objects can be lost or damaged in transport. The ability to track objects along their transportation path is therefore important. If an object disappears, for example because of theft or because it was loaded on the wrong vehicle by mistake, its last known location must be established and proven. Or, if an object was damaged in transit, the last location passed by the object in undamaged condition as well as the first location where the object arrived in a damaged state must likewise be found and documented. This is an important aspect in settling liability disputes and insurance claims.

The dimensional weight of an object can be determined by manually taking measurements and entering the data into a computer system, which is the procedure commonly used at the retail locations of postal service organizations and parcel-shipping companies. However, in large-scale facilities where many shipments are processed at a fast pace and out of sight of the customer, such manual methods are error-prone and can result in either overcharging or undercharging a customer. In response to this problem, various methods and solutions have been developed to determine the dimensional weight of objects in distribution facilities and warehouses, including laser-ranging and laser-scanning systems.

Devices for the automated determination of dimensional weight of an object, also referred to as dimensioning systems, belong to the known state of the art, for which WO9427166 (U.S. Pat. No. 6,177,999) may be cited as an example. A collimated light beam is moved across a belt conveyor by means of a deflector unit, in this case a rotating mirror polygon combined with a parabolic mirror, so that objects moving on the conveyor belt are scanned line-by-line. The plane of the scanning beam is inclined by a small angle of incidence θ relative to the surface normal of the conveyor belt, and the height of a point of incidence on the object from the level of the conveyor belt is determined by photographic triangulation of the reflected light returning from the object.

A system for mapping the three-dimensional surface geometry of objects which is described in U.S. Pat. No. 7,215,430 B1, uses LIDAR (the term is thought to be a composite of "light" and "radar"), a remote sensing technology that measures distance by illuminating a target with a laser and analyzing the reflected light. The object is surveyed from a single viewing point and recorded in the form of a so-called point cloud representing the sensed positions of the sensed points of the target surface in a form that may be further processed with CAD Software Tools.

The system proposed in U.S. Pat. No. 7,215,430 B1, which generates an image of a stationary target object from a single perspective, is however not suitable for the purpose of tracking objects in transport, as the objects usually present themselves randomly at different viewing angles.

State-of-the-art dimensioning systems of the kind manufactured by the assignee of the present invention generally contain a plurality of scanners, each of which has a laser light source, a deflector device and a light receiver arranged inside one compact scanner unit. A modulated laser beam emitted by the light source is swept by the deflector unit in a fan-like manner over the object, so that the point of incidence of the laser beam moves over the surface of the object along a scan line. For in-motion scanning of objects traveling on a conveyor belt, the sweep of the laser beam moves in a plane transverse to the travel direction of the object, so that successive sweeps of the laser beam intercept the surface of the moving object along parallel scan lines.

Objects can also be dimensioned while they are in a stationary position. The scanners used in this case have deflector units which not only move the laser beam in fan-like sweeps, but simultaneously swivel the plane of the sweeping movement, so that the scan covers a surface area of the stationary object. As an alternative, the state of the art also includes dimensioning systems where the scanned object is at rest, while the one or more scanners are moved in a controlled manner relative to the object.

Reflected light returning from the object is optically focused onto the light sensor. At discrete points in time, based on the time delay or phase shift between the emitted light and the received light, the distance traveled by the light is calculated. The travel distance together with the known spatial direction of the laser beam at that same point in time allows the position of the point of incidence on the object surface to be determined in spatial coordinates.

The totality of surface points determined in this manner by the one or more scanners of a dimensioning system can be assembled in a so-called point cloud which represents a three-dimensional virtual model of the object surface. From this three-dimensional model, the length l, width w and height h, and thus the dimensional weight D, can be determined for any object regardless of its shape and its orientation relative to the scanners and/or regardless how the object is positioned in relation to the travel direction of a conveyor belt on which the object could be travelling.

In addition to determining the phase shift or time delay of the light returning from the target object and calculating the surface contours of the objects under investigation, laser range finders, including those used in dimensional weight systems, also measure the intensity of the returning light. Since a low intensity level of the returning light goes together with a low signal-to-noise ratio, the intensity values can be used to verify the integrity of the measurement.

It has occurred to the inventors that the intensity data that have heretofore been gathered only for the purpose of validating the time delay or phase shift data from which dimensional weights are calculated could also be used to tint the surface of the three-dimensional virtual model in monochromatic tones corresponding to the intensity levels. Based on the three-dimensional surface-tinted model, grayscale images of the object from any viewing angle exposed to the scanner rays could then be synthesized on demand.

The present invention therefore has the objective to propose a method, whereby based on the data gathered by a dimensioning system, including the intensity values, a three-dimensional model of the scanned object is assembled and stored for the purpose of documenting the presence as well as the appearance of the object at the time and place of the scan, and to further propose a system with the capability to perform the method.

SUMMARY

This objective is met by the methods and devices set forth in the appended claims.

A method of using a dimensioning system with a plurality of laser scanners, each of which contains an emitter of a collimated beam of modulated laser radiation, a dynamic beam deflector to move the collimated beam in a sweeping motion over the object, and a radiation sensor to receive the radiation reflected from the object and convert it into an electrical signal, processor means to control the operations of the scanners, to receive and process the electrical signals produced by the radiation sensors of the scanners, and to execute said method, memory means to store data delivered by the software means, allows an image of an object surface from any viewing angle that was exposed to the scanner rays to be synthesized based on data acquired by the dimensioning system in its regular mode of operation. According to the method, a distance traveled by the laser beam is calculated at discrete points in time based on the time delay or phase shift between emitted and received radiation. Using the distance value, the spatial direction of the beam, and the intensity at each of the discrete points in time, a three-dimensional model of surface points of the object is formed including spatial coordinates and the intensity value for each surface point. The three-dimensional model is stored in the memory means as a record of the appearance of the object at the time the scan was taken. Based on the three-dimensional model, two-dimensional images from any desired viewing angle that was exposed to the scanner rays can be produced on demand to document the appearance of the object at the time the scan was taken.

The method can be seen as a way to make additional use of the data that are collected by a state-of-the-art dimensioning system in the course of its regular operation. In order to be able to dimension irregular-shaped objects, the system has to capture a dense pixel cloud of surface points covering the entire object. In the dimensioning of the object, the pixels are processed with the purpose of finding the extreme points on the object which determine the smallest rectangular box that the object will fit into. To construct the three-dimensional model of the object, on the other hand, the same pixel cloud is combined into a three-dimensional model of the object surface tinted in grayscale tones based on the measured intensities.

The three-dimensional model can be rotated in order to produce a two-dimensional image of the object surface as seen from any desired viewing angle that was exposed to the scanner rays. The method has the advantage that it uses an existing dimensioning system rather than requiring a plurality of cameras that would have to be installed in different locations in order to capture the entire surface of the object in two-dimensional images. The method thus adds an imaging function to existing dimensioning systems without the cost and complexity of additional hardware.

The method can further include a step in which any points that are not part of the object of interest are removed from the three-dimensional model. This not only reduces the image file size, but also avoids revealing any aspects of the operating environment in which the dimensioning and imaging of the object took place, such as the personnel, equipment and procedures involved in handling the object.

In the practical use of the method, it is most advantageous if the recording of the three-dimensional model takes place every time the object is subjected to a dimensioning process, which occurs normally when the object changes custody during transportation, for example when the object passes from a rail freight company into the responsibility of a trucking company or a warehousing company. Thus, if the object is later found to be damaged, two-dimensional images of the object from the appropriate viewing angle that was exposed to the scanner rays can be obtained based on the dimensioning records stored at each stage in order to determine the party liable for the damage.

As another advantageous use of the method, the recordings of the three-dimensional model or the images produced from them can also serve to document the presence of the object at different stages of its transportation or storage and determine a point at which a loss of the object occurred.

In view of these uses of the three-dimensional model or of the images to document damage or loss and establish liability, a time stamp is preferably added automatically to each recording in order to allow the object and its condition to be tracked over time.

The method can be performed in essence with any of the scanning arrangements used for the automated dimensioning of objects. This includes setups where the laser scanners are arranged in fixed positions and the object is at rest during the scan. For example, palleted cargo could be set down at a scanning location by a forklift truck, then scanned by at least three stationary scanners from different directions to record the entire surface of the object, and subsequently picked up again and carried away by the forklift truck.

In a very common configuration, the object is in motion during the scan, traveling through a location covered by at least two laser scanners that are arranged in fixed positions. Typically in such a system, the object is travelling on a belt conveyor which passes under a yoke or other support structure on which the scanners are mounted. In this arrangement, the speed of the conveyor belt is one of the quantities entering into the calculation of the surface points of the three-dimensional model, as the belt speed and the sweep frequency of the scanners together determine the distance between the scan lines.

It is also conceivable that the object is moved through the scan area on a forklift truck. In contrast to the preceding example where the object moves on a conveyor belt, the direction and speed of the forklift truck are not known system constants. A different state-of-the-art method has to be used in this case for the calculation of the three-dimensional model based on the scans of a randomly moving object.

The method can also be performed with a dimensioning system in which the object is at rest during the scan and the laser scanners are moved over the object in a controlled manner. The scanners could for example be mounted on a carriage that moves back and forth on a track on the ceiling. As a relative linear movement between the scanner system and the object, this case is analogous to the aforementioned example with a conveyor belt.

In the spirit of the method as a means of documentation for cargo objects, it is further advantageous if the dimensioning system comprises a reader device to register an identification code carried by the object and to assign the identification code to the three-dimensional model and to two-dimensional images that are synthesized from the three-dimensional model.

The scope of the present invention further includes dimensioning systems designed to carry out the method according to any aspect of the foregoing description. Such a system generally includes:

a plurality of laser scanners, each of which contains an emitter of a collimated beam of modulated laser radiation, a dynamic beam deflector to move the collimated beam in a sweeping motion over the object, and a radiation sensor to receive the radiation reflected from the object and convert it into an electrical signal, processor means to control the operations of the scanners, to receive and process the electrical signals produced by the radiation sensors of the scanners, and to execute said method, and memory means to store data delivered by the software means.

Furthermore, the scope of the invention also covers a software program designed to implement the method on an existing state-of-the-art dimensioning system.

BRIEF DESCRIPTION OF THE DRAWINGS

In the following, the invention will be explained in more detail through examples and references to the attached drawings, wherein.

DETAILED DESCRIPTION OF A PREFERRED EMBODIMENT

Figure 1:
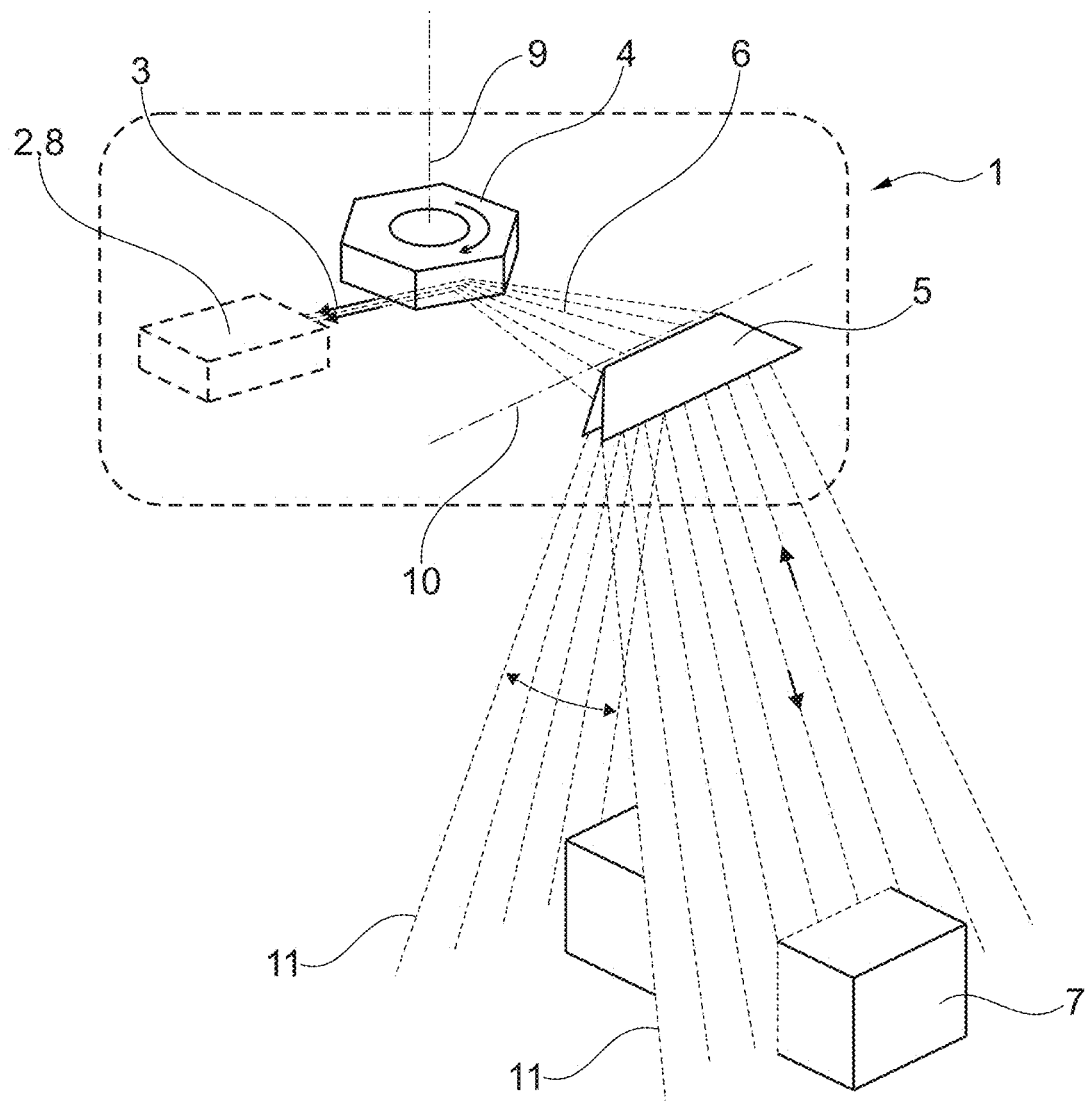
FIG. 1 illustrates an example for the sweep action of one of the laser scanners used to carry out the method.

FIG. 1 schematically illustrates a laser scanner 1 of a type that can be used to carry out the method of the present invention. Its principal components are an emitter 2 of a collimated beam 3 of modulated laser radiation, a dynamic beam deflector 4, 5 to move the collimated beam 3 in fan-shaped sweeps 6 over the object 7 (wherein the latter can be at rest or in motion), and a radiation sensor 8 (arranged here in a combined emitter/receiver unit 2, 8) to receive the radiation reflected from the object 7 and convert it into an electrical signal.

After leaving the emitter 2, the laser beam 3 meets the hexagonal mirror prism 4 which in the arrangement of FIG. 1 rotates about a vertical axis 9 and causes the laser beam 3 to perform continuous fan-like sweeps in a horizontal plane. A second deflector 5, here in the form of a planar mirror 5 swiveling about a horizontal axis 10 deflects the sweeping laser beam 3 into the area of the object 7. As a result of the swivel movement of mirror 5, the reflected sweep 11 of the laser beam 3 likewise swivels back and forth, so that a surface of an object 7 that is exposed to the combined sweep and swivel movement of the laser beam 3 can be captured by the scan. However, it should be noted that the deflector arrangement 4, 5 as well the combined sweep/swivel motion described and illustrated here are intended only as a practical example of a scanner arrangement and are not to be interpreted as limitations of the invention.

Figure 2:
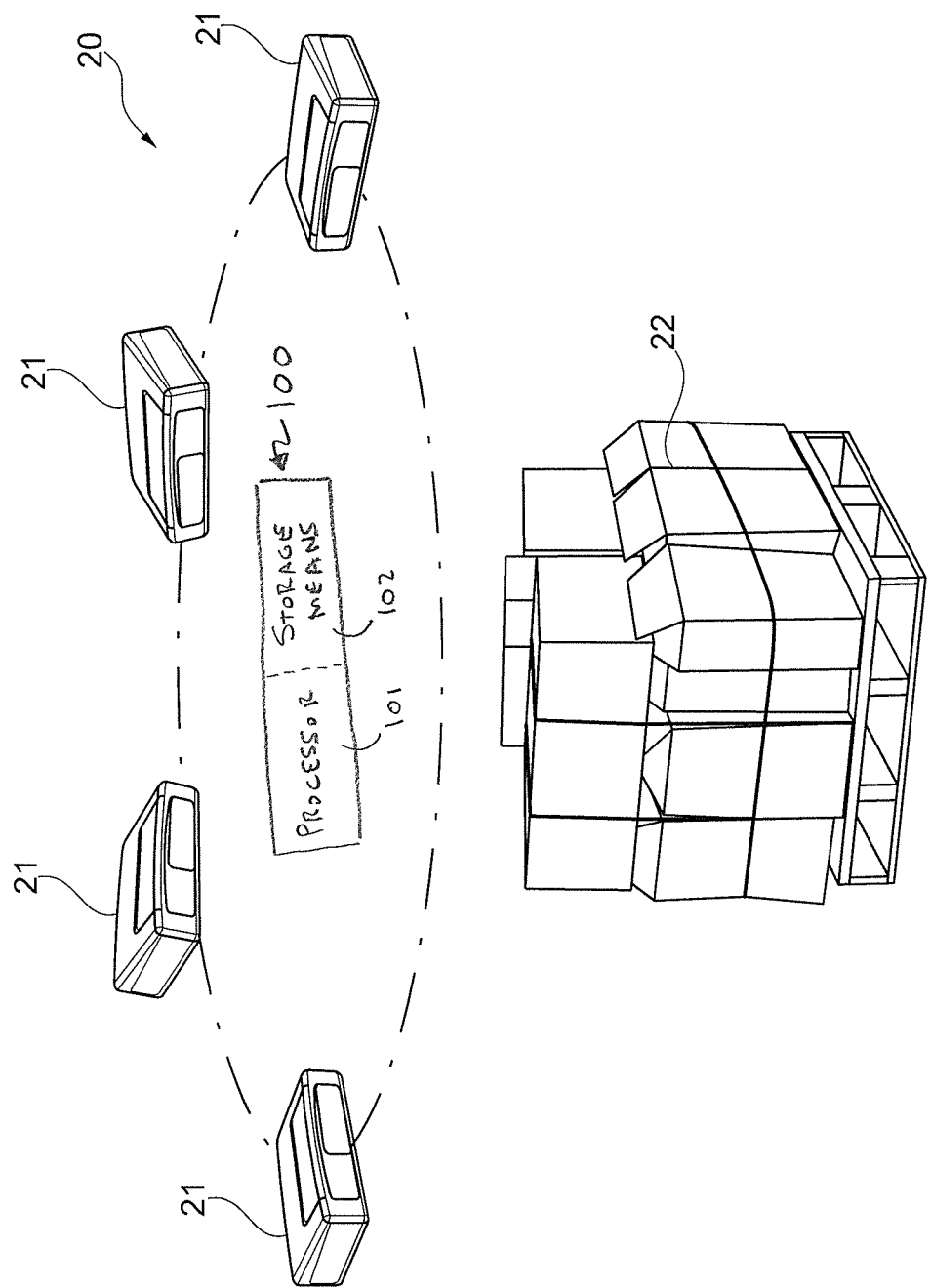
FIG. 2 illustrates a scanner arrangement of a dimensioning system used to scan an object that is at rest during the time period when the scanning takes place.

FIG. 2 schematically shows a dimensioning system 20 with four scanners 21 of the type illustrated in FIG. 1. The scanners 21 can be mounted for example on the ceiling, aiming at an area where loaded pallets 22 or other cargo objects are temporarily set down for scanning and dimensioning. The overlapping scan data collected by the four scanners 21 are processed by a computer 100 and assembled into a three-dimensional virtual model of the cargo object. As detailed below with regard to the method of FIG. 5, the computer 100 will have a processor 101 adapted with software instructions to control the operation of each of the laser scanners, and a storage means 102 in communication with the processor 101. The calculation and the assembly of the three-dimensional virtual model are realized by a processor in the computer.

Figure 3:
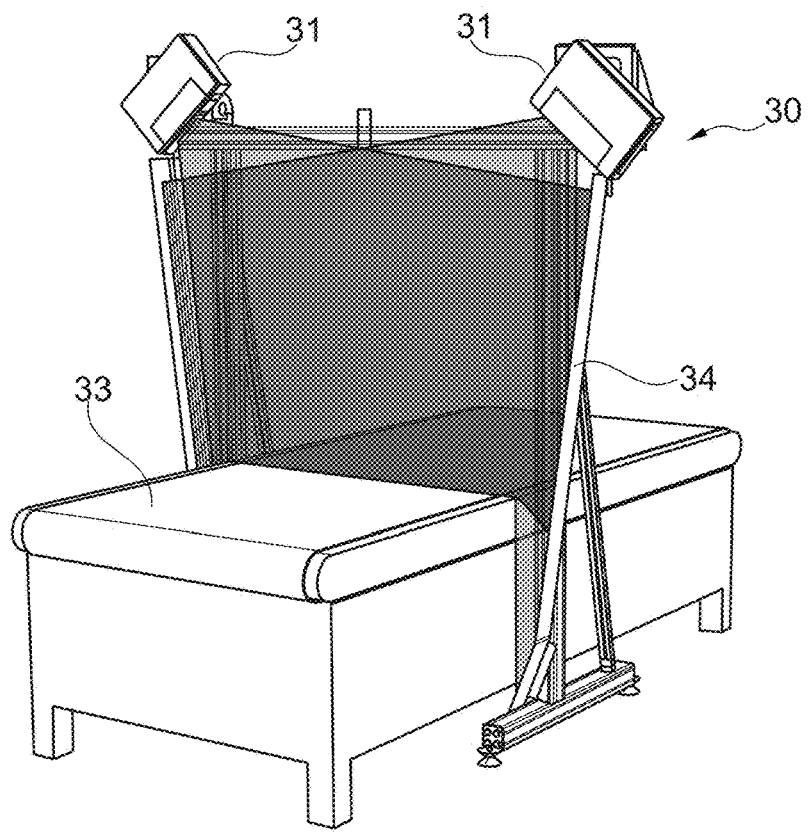
FIG. 3 illustrates a scanner arrangement of a dimensioning system used to scan objects travelling on a conveyor belt.

FIG. 3 illustrates a dimensioning system 30 for packages or other objects moving on a conveyor belt 33. Two scanners 31 are mounted on a yoke-shaped frame 34 in a so-called dual-head arrangement. As the conveyor belt 33 moves substantially transverse to the fan-like sweeps of the scanners 31, it is possible to perform the dimensioning by using scanners of a type without the swiveling second deflector 5 (see FIG. 1). The successive planar sweeps of the laser beams intercept the moving object surface along a series of parallel scan lines, so that for dimensioning purposes, the entire object can be covered without superimposing a swivel movement to the fan-like sweep of the scanner beam.

Figure 4:
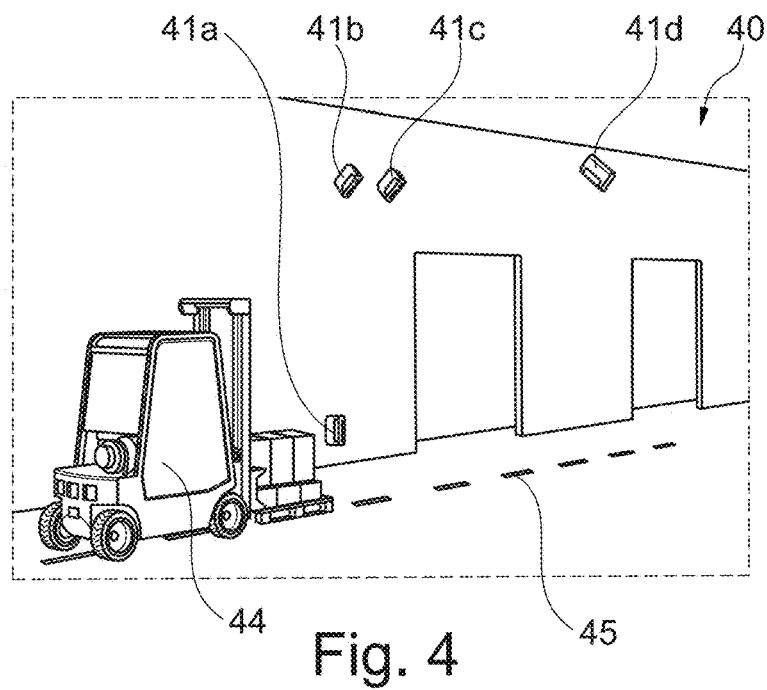
FIG. 4 illustrates a scanner arrangement of a dimensioning system used to scan objects on a forklift truck in motion.

FIG. 4 shows a dimensioning system 40 arranged in a warehouse along a path 45 passed by a forklift truck 44. Four scanners 41*a*, 41*b*, 41*c*, 41*d* are mounted in different positions along the path 45 of the forklift truck. The scanners 41*b* and 41*d* are arranged on opposite sides of the path 45, for example suspended from the warehouse ceiling, and are forming a dual-head arrangement analogous to the two scanners 31 in the dimensioning system 30 of FIG. 3. The scanner 41*c* in cooperation with the scanner 41*b* serves to measure the speed and direction of the forklift truck 44. The scanner 41*a* is mounted on one side of the path 45 close to the warehouse floor and serves to measure the height of the pallet and cargo carried by the forklift truck 44. The scan information, including the intensity values, collected by the dimensioning system 40 serves to establish the three-dimensional model data for the truck and cargo. Using state-of-the-art image-processing techniques, the forklift truck as well as any of the warehouse surroundings recorded by the scanners can be removed from the three-dimensional model at any stage before a two-dimensional image is issued.

Figure 5:
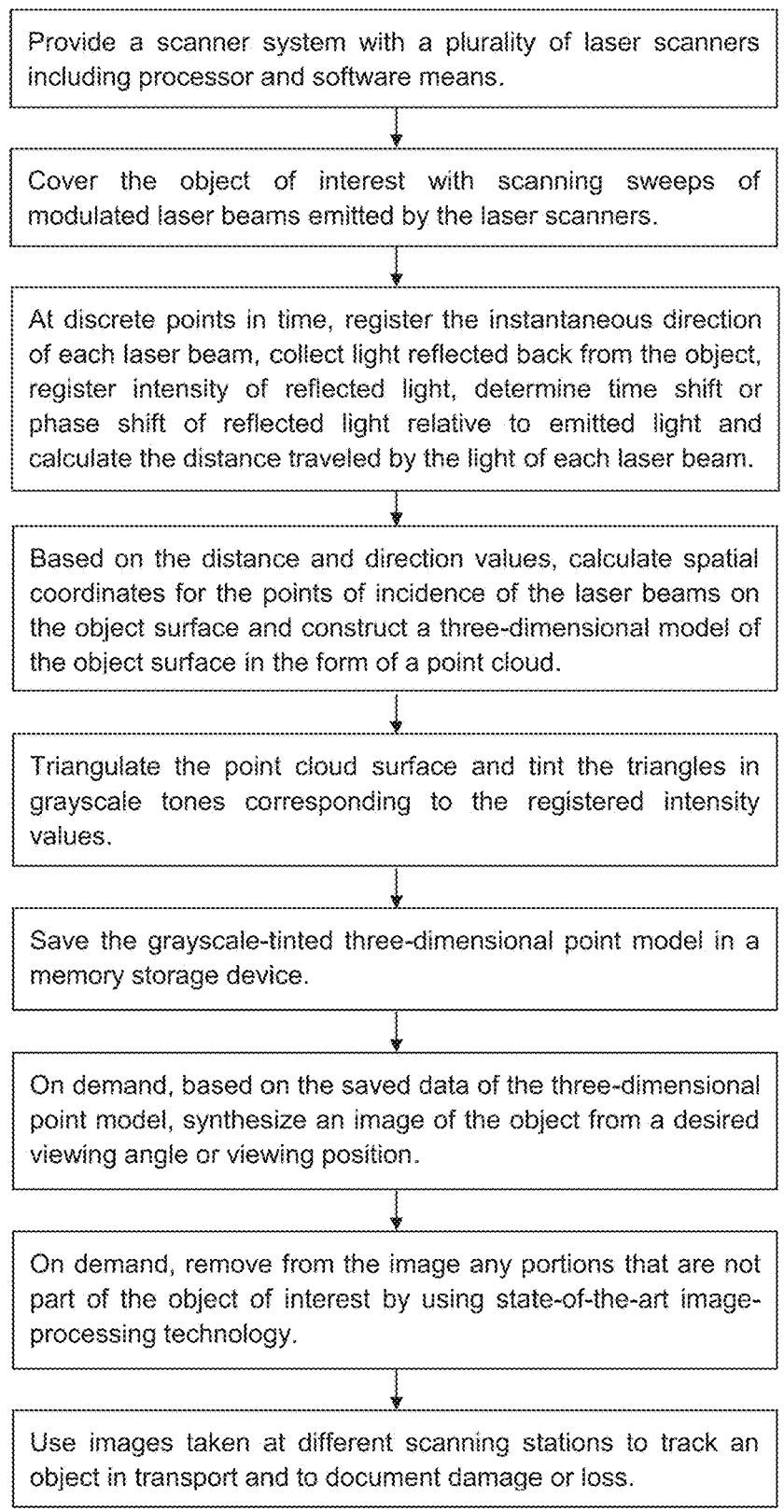
FIG. 5 represents a flowchart of the method according to the invention.

Finally, FIG. 5 delineates the method of the invention in the form of a flowchart, recapitulating the essential steps which have been covered in the description as well as in the claims.

Although the invention has been described by presenting several examples demonstrating the practice of the method in a transportation and logistics environment, it is considered evident that numerous further variants could be created based on the teachings of the present invention, for example by adding one or more scanners to any one of the illustrated dimensioning systems 20, 30, 40 shown in FIGS. 2 to 4 in order to better capture the surfaces of more complicated objects, or by combining features of the individual embodiments with each other and/or by interchanging individual functional units between the embodiments.

What is claimed is:

1. A system for dimensioning an object, comprising
a plurality of laser scanners, each of which comprises:
    an emitter of a collimated beam of modulated laser radiation;
    a dynamic beam deflector to move the collimated beam in a sweeping motion over the object; and
    a radiation sensor, for receiving the radiation reflected from the object and translating the reflected radiation into an electrical signal,
a processor, adapted with software instructions to control the operation of each of the laser scanners, to receive and process the electrical signals produced by the radiation sensors, and to perform the following functions:
    at discrete points in time, calculates a distance value based on a time delay or phase shift value between the radiation emitted by each of the laser scanners and received by the corresponding radiation sensor, based on a spatial direction of each emitted and received beam, the distance value, and an intensity at each individual point in time,
    assembles a three-dimensional model of surface points of the object including an intensity value associated with each surface point, and
storage means, in communication with the processor, to receive and store the three-dimensional model, such that, on demand, the three-dimensional model is used to produce two-dimensional images from any desired viewing angle that was exposed to the emitted beams from each scanner to document an appearance of the object at a time when a selected scan was taken.

2. A method of producing an image of an object based on data acquired by a dimensioning system which, in a regular mode of operation, generates a dimensional weight for the object, the dimensioning system comprising a plurality of laser scanners, each of which contains an emitter of a collimated beam of modulated laser radiation, a dynamic beam deflector to move the collimated beam in a sweeping motion over the object, and a radiation sensor arranged to receive the radiation reflected from the object and convert the radiation into an electrical signal, a processor adapted to control the operation of the scanners, to receive and process the electrical signals produced by the radiation sensors, and to execute software instructions configured on the processor to calculate distance values, at discrete points in time, based on a time delay or phase shift value between the radiation emitted by each of the laser scanners and received by the corresponding radiation sensor and based on a spatial direction of the collimated beam, a distance value, and an intensity at each individual point in time, calculate a dimensional weight as a multiplicative product of a length, a height, a width and a predetermined density factor, wherein the method comprises the steps of:
    assembling a three-dimensional model of surface points of the object including an intensity value associated with each surface point, and
    recording the three-dimensional model in a memory means, wherein the three-dimensional model is available to produce, on demand, two-dimensional images from any desired viewing angle that was exposed to the emitted beams from each scanner to document an appearance of the object at a time a selected scan was taken.

3. The method of claim 2, wherein the recording of the three-dimensional model takes place every time the object is subjected to a dimensioning process.

4. The method of claim 2, wherein the laser scanners are arranged in fixed positions and the object is at rest during the step of producing an image of the object.

5. The method of claim 2, wherein the object is at rest during the step of producing an image of the object and the laser scanners are moved over the object in a controlled manner.

6. The method of claim 2, wherein the laser scanners are arranged in fixed positions and the object is in motion during the step of producing an image of the object.

7. The method of claim 6, wherein the object is moving on a conveyor belt during the step of producing an image of the object.

8. The method of claim 6, wherein the object is being moved by a forklift during the step of producing an image of the object.

9. The method of claim 2, comprising the further step of:
    removing from the three-dimensional model any surface point data that are not part of the object of interest.

10. The method of claim 9, wherein a time stamp is added to each recording to allow the object and its condition to be tracked over time.

11. The method of claim 10, wherein the time-stamped two-dimensional images of the object from a desired viewing angle that was exposed to the emitted beams from each scanner are used to document damage suffered by the object in transportation or storage and determine a time interval when the damage occurred.

12. The method of claim 10, wherein the time-stamped two-dimensional images of the object from a desired viewing angle that was exposed to the emitted beams from each scanner are used to document the presence of the object at different stages of its transportation or storage and determine a point after which a loss of the object occurred.

* * * * *